J. H. BLAKE.
CAR WHEEL.
APPLICATION FILED DEC. 3, 1921.
1,413,385.
Patented Apr. 18, 1922.
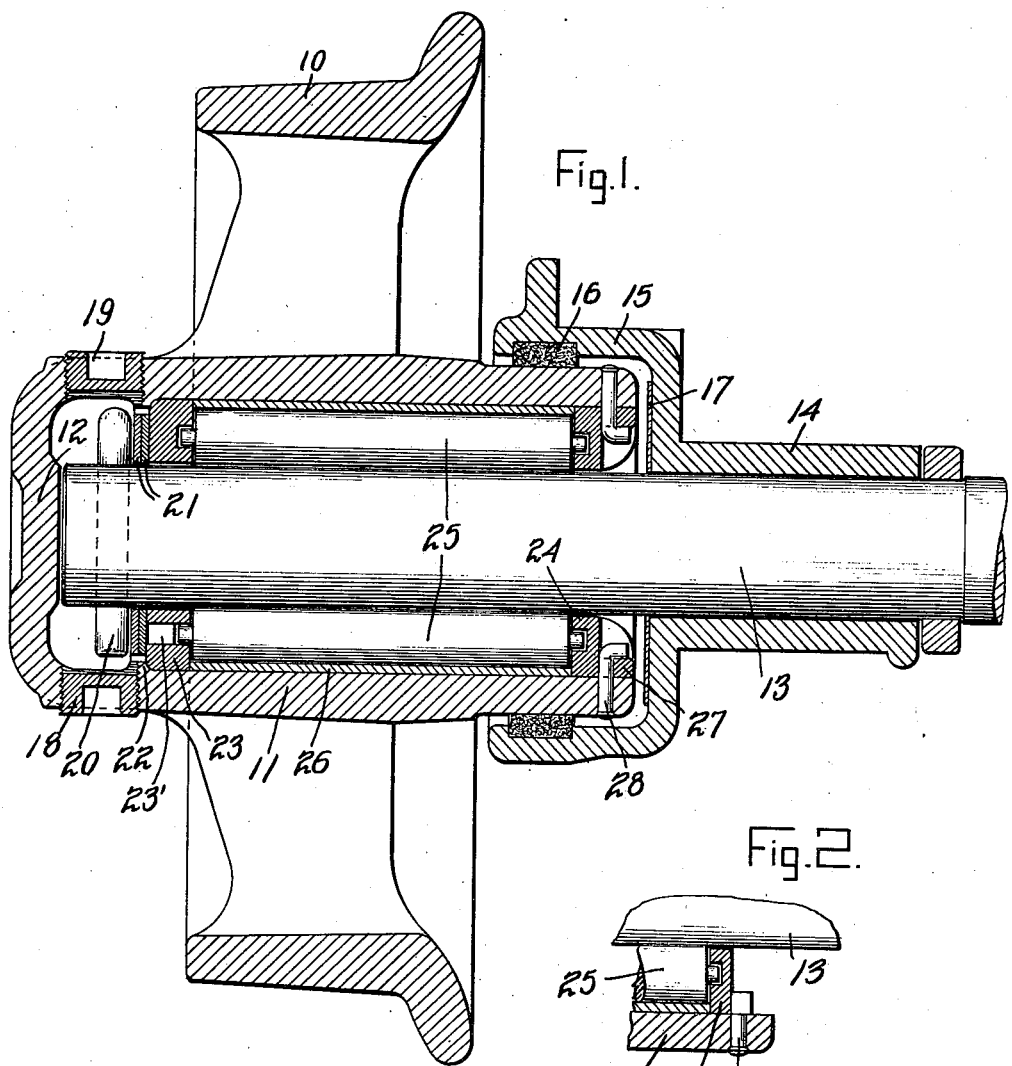
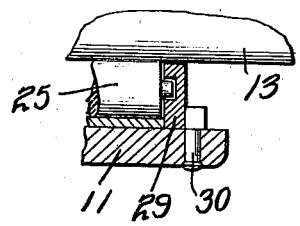
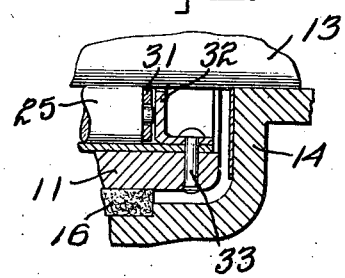
Inventor
John H. Blake

UNITED STATES PATENT OFFICE.

JOHN H. BLAKE, OF KNOXVILLE, TENNESSEE.

CAR WHEEL.

1,413,385.  Specification of Letters Patent.  Patented Apr. 18, 1922.

Application filed December 3, 1921. Serial No. 519,710.

*To all whom it may concern:*

Be it known that I, JOHN H. BLAKE, a citizen of the United States, residing at Knoxville, in the county of Knox and State of Tennessee, have invented certain new and useful Improvements in Car Wheels, of which the following is a specification.

My said invention relates to an improved wheel attaching means for railway cars and it is an object thereof to provide means that can readily be attached and also detached should this become necessary.

A further object is to provide a device of this sort that shall be free from excessive friction and be long wearing, yet inexpensive to manufacture.

Referring to the accompanying drawings which are made a part hereof and on which similar reference characters indicate similar parts, Figure 1 is a vertical section of the device, and Figures 2 and 3 show modified forms of a part thereof.

In the drawings reference character 10 indicates a car wheel having a hub 11, the latter being cored out and having at its forward end a thrust bearing portion 12 against which the axle 13 is adapted to abut.

An axle box 14 is attached to the bottom of the car in the usual manner and is provided with a forwardly extending flange 15 extending over the hub of the wheel. Between such flange and the hub there is an annular packing ring 16 of felt or the like which acts as a dust guard and the action of which is supplemented by a second dust guard 17 formed as a thin plate fitting closely about the axle. The two packings also serve to maintain the lubricant in the wheel. This last washer 17 also serves as a wearing plate between hub 11 and box 14 should contact occur. At the forward end the wheel has a pair of openings provided with screw-threaded closures 18 and 19 through which openings lubricant can be introduced and which also serve to admit a linch pin 20 into the forward cavity of the wheel. This linch pin extends through a hole in the axle and bears against a pair of annular washers 21 on the axle. These washers are in part surrounded by an inwardly extending flange 22 on the wheel forming a partial separation between the forward and rear chambers of the hub.

The rear chamber of the hub contains at its forward end a ring 23 bearing against the flange 22 and fitting closely within the head and at its front end. This ring forms in effect a diaphragm further separating the bore of the hub into front and rear chambers. The rear chamber also contains a ring 24 and the two rings each have a race-way for the journals on a set of roller bearings 25 which lie in contacting relation about the axle. One or more openings such as that shown at 23' serve to admit lubricant to the roller bearings.

Between the rings 23 and 24 I provide a cylindrical shell or spacer 26 preferably made of steel which also forms a lining for the bore of the car wheel and takes the wear of the rollers.

The rearmost ring 24 is formed with a rearwardly extending flange 27 and a series of rivets 28 extending through registering openings in the flange and the rear end of the hub and serve to secure all the parts in assembled position. If preferred the shell 26 may extend to the rear end of the bore and be riveted or otherwise fixed thereto.

In the modification shown in Figure 2 a ring 29 takes the place of ring 24, the latter ring not having a rearwardly extending flange. In this modification the rivets 30 instead of being formed with a bent-over portion extending over the flange have a flat rear side and are held by rivets each having an eccentric head bearing with a flat face against the collar, instead of a bent end portion as in Figure 1. In this form the collar may rotate. After being placed in position as shown the outer end of each rivet is headed over as indicated.

In the modification of Figure 3 in place of a single ring I have provided a pair of rings 31 and 32, the first forming merely a loose retainer for the journals of the roller bearing. There is also another retaining ring 31 at the other end of the roller. These rings 31 serve only to retain the rollers in position when the axle is removed. The second ring 32 which may be of stamped metal has a rearwardly extending flange through which are passed ordinary rivets 33 which take the place of those shown in the other figures.

When the wheel is cast the inside chamber is in one compartment which is closed at the front and open at the rear. The holes for closures 18 and 19 are now drilled and washers 21 and retainer 23 are inserted, the retainer ring resting against the shoulder at 22. The sleeve or casing 26 is now introduced into the bore after which the roller bearings and the locking ring 24 are put in place, the latter being fixed by means of pins or rivets 28. The wheel is now placed upon the axle which passes through into the front chamber of the same where the washers 21 are placed on the axle and the linch pin 20 is thereafter inserted through a hole in the axle and positioned in the transverse opening of the axle as shown.

It will be seen that the parts are all securely held in place and yet the whole device is simple and easily cleaned and examined. At the same time the parts offer little difficulty in manufacturing especially as the casting of the wheel is considerably simplified over the usual process, where an integral partition takes the place of loose ring 23. The washers 21 distribute the wear between the pin 20 and the face of the ring 23. The thrust of the axle in the other direction is received on the inner end face of the hub and the contacting faces are formed true to the axis of rotation and may be ground or otherwise rendered smooth to minimize friction which hitherto has not been possible as the diaphragm here replaced by the shoulder 22, ring 23 and washers 21 has heretofore been cast integral with the wheel.

It will be obvious to those skilled in the art that numerous other modifications may be made in the device without departing from the spirit of the invention, the true scope of which is shown by the appended claims.

Having thus fully described my said invention, what I claim as new and desire to secure by Letters Patent, is:

1. In a railway car, a wheel having a hollow hub open at the rear end only, an axle therefor, a retaining device removably secured to the wheel and dividing the interior of the hub into compartments and a linch pin engaging the axle in the forward compartment and co-acting with the retaining device to limit relative longitudinal movement of the wheel and axle, substantially as set forth.

2. In a railway car, a wheel having a hollow hub open at one end, an axle therefor and means to prevent disengagement of the wheel and axle, comprising a linch pin in the axle, a removable diaphragm adjacent the pin, means to limit forward movement of the diaphragm, a sleeve abutting against the diaphragm to prevent rearward movement thereof and means to hold the sleeve in place, substantially as set forth.

3. In a railway car, a wheel having a bore open at one end, an axle therefor and means to prevent disengagement of the wheel and axle comprising a linch pin in the axle, a sleeve in the bore, means to hold the sleeve in place, a diaphragm within the bore between the linch pin and the end of the sleeve and roller bearings between the sleeve and the axle, substantially as set forth.

4. In a railway car, a wheel having a hollow hub open at one end, an axle therefor and means to prevent disengagement of the wheel and axle comprising a linch pin in the axle, a removable annular diaphragm adjacent the pin, a sleeve abutting against the diaphragm, means to hold it in place, a rear ring bearing against the sleeve, means to hold the rear ring against rearward movement, roller bearings between the sleeve and axle, and said diaphragm and rear ring having tracks for the journals of said roller bearings, substantially as set forth.

5. In a railway car, a wheel having a hollow hub with an annular shoulder adjacent one end thereof, an axle therefor and means to prevent disengagement of the wheel and axle comprising a linch pin in the axle, a pair of grooved rings in the hub and roller bearings between the rings having journals extending into said grooves, substantially as set forth.

6. In a railway car, a wheel having a hollow hub, an axle therefor, and means for limiting the relative movement between them comprising a linch pin passing through the axle, an integral closure at the end of the hub with its surface parallel to the end surface of the axle, a removable diaphragm fixed to the wheel at the opposite side of the linch pin and a plurality of washers between the diaphragm and the linch pin, substantially as set forth.

7. In a car wheel having a hollow hub, an annular set of rollers, a hardened shell between the rollers and the hub, retaining rings at each end of the rollers, said hub having a fixed abutment engaging the forward ring and rivets for holding the rear ring in place, substantially as set forth.

8. In a railway car a wheel having a hollow hub open at the rear end and diametrically opposed openings adjacent the front end, an axle in said hub, a linch pin adapted to be inserted into the axle through said forward openings, roller bearings between the hub and axle, and supporting rings for said roller bearings held in fixed position in the hub, the forward ring having means for admitting oil to the roller bearings, substantially as set forth.

9. In a railway car, a wheel having a hollow hub open at the rear and an annular shoulder near the front of the bore, a retaining ring resting against said shoulder and dividing the bore into front and rear compartments, a sleeve bearing against the rear face of the retaining ring, and means at the rear of the sleeve to hold the sleeve and retaining ring in fixed position in the hub, substantially as set forth.

10. In a railway car, a wheel having a hollow hub open at the rear, said hub having a shoulder near the front, a removable diaphragm resting against said shoulder and dividing the bore of the hub into front and rear compartments, roller bearings in the hub, a ring at the rear of said roller bearings and removable means for holding said ring in place, substantially as set forth.

11. In a railway car, a wheel having a hollow hub open at the rear end and diametrically opposed openings adjacent the front end, an axle in said hub, a linch pin adapted to be inserted into the axle through said forward openings, roller bearings between the hub and axle, supporting rings for said roller bearings held in fixed position in the hub, the forward ring having means for admitting oil to the roller bearings, a journal box for the axle having a flange extending over the wheel, a packing between said flange and hub, and a second packing between the journal box and the axle, substantially as set forth.

In witness whereof, I have hereunto set my hand and seal at Knoxville, Tennessee this 25th day of November, A. D. nineteen hundred and twenty-one.

JOHN H. BLAKE. [L. S.]

Witnesses:
J. E. CRUMBLISS,
SAM H. MCCRARY.